United States Patent [19]
Latulippe et al.

[11] Patent Number: 6,056,472
[45] Date of Patent: May 2, 2000

[54] VERSATILE COUPLING MEMBER FOR INJECTION MOLDING EJECTOR SYSTEM

[76] Inventors: Michael Leo Latulippe, 91 Old Auburn Rd., Derry, N.H. 03038; Gerard George Normand, 29 Plummer St., Manchester, N.H. 03102

[21] Appl. No.: 08/939,327

[22] Filed: Sep. 29, 1997

[51] Int. Cl.⁷ .................................................. B25G 3/00
[52] U.S. Cl. ......................... 403/301; 403/299; 403/313; 425/444; 425/192 R
[58] Field of Search ................................. 403/299, 300, 403/301, 306, 307, 48, 47, 326, 313, 309, 310, 296; 425/444, 192 R

[56] References Cited

U.S. PATENT DOCUMENTS

| | | | |
|---|---|---|---|
| 3,844,703 | 10/1974 | Hutter | 425/444 X |
| 4,133,460 | 1/1979 | Jerpbak | 29/402.08 |
| 4,790,739 | 12/1988 | Manfredi | 425/129 R |
| 5,087,188 | 2/1992 | Staver | 425/444 X |

OTHER PUBLICATIONS

NoWeare by Design, "Hasbro®" catalog, pp. 8.

*Primary Examiner*—Lynne H. Browne
*Assistant Examiner*—David E. Bochna
*Attorney, Agent, or Firm*—Davis and Bujold

[57] ABSTRACT

A coupling member for interconnecting a hydraulic ejector cylinder, of injection molding equipment, with a mold ejector system to insure that the mold ejector system of the mold is properly activated and returned to its fully retracted position prior to commencing a further injection molding cycle. The coupling member comprises a first elongate stud which is releasably couplable to a second elongate stud to form the coupling member. The first elongate stud has a head, at one end thereof, and the second elongate stud has a stud recessed portion, at a mating end thereof, for at least partially receiving the head. A locking mechanism, carried by the second elongate stud, allows engagement and disengagement of the head from the stud recessed portion, when in a first position, and secures the head at least partially within the stud recessed portion, when in a second position.

19 Claims, 5 Drawing Sheets

VERSATILE COUPLING MEMBER FOR INJECTION MOLDING EJECTOR SYSTEM

FIELD OF THE INVENTION

The present invention relates to a novel and versatile coupling member which interconnects a hydraulic ejector cylinder, of an injection molding machine, with a mold ejector system to insure that the mold ejector system of the mold is actuated and returned to its fully retracted position prior to commencing a further injection molding cycle.

BACKGROUND OF THE INVENTION

A major problem associated with current injection molding equipment is insuring that the mold ejector system, which may be spring biased into a fully retracted position, is both activated to eject the molded piece or component and then move to a fully retracted position prior to commencing a further injection molding cycle. If the mold ejector system is not properly operated, e.g. activated and then not fully retracted, this could lead to damage to the mold and/or the injection molding equipment thereby resulting in expensive repair work as well as a loss in crucial production time.

A variety of prior art arrangements are currently available on the market which assists with operation of the mold ejector system prior to commencing a further injection molding cycle. However, the known coupling members are manufactured specifically for a piece of injection molding equipment and are typically not interchangeable with various other molds which can be utilized on the same molding equipment. Further, the known coupling members can not be readily employed on other known brands of injection molding equipment. This causes a manufacturer to purchase a variety of different coupling members, depending upon the injection molding equipment and/or the type of molds being used with the injection molding equipment, to insure that the ejector system of the mold is completely retracted prior to commencing a further molding cycle. This lack of a universal coupling member, for coupling the hydraulic ejector cylinder to the mold ejector system, leads to increased production cost and inhibits utilization of a variety of different molds, without extensive and costly set up time, on the same injection molding equipment.

A further inherent problem associated with today's injection molding equipment is that there not any standards concerning the size of the bore holes of the hydraulic ejector cylinder or the mold ejector system. That is, the bore size can vary from manufacturer to manufacturer or from an inexpensive piece of equipment to a more expensive piece of equipment produced by the same manufacture. In addition, the spacing of a proximate end surface of the mold ejector system from an adjacent end surface of the movable platen, can vary depending upon the action of the mold, the manufacturer of the mold, as well as a variety of other factors and parameters. Such variations further inhibit the interchangeability and versatility of the coupling members which heretofore been employed.

SUMMARY OF THE INVENTION

Wherefore, it is an object of the present invention to overcome the aforementioned problems and drawbacks associated with the prior art designs.

Another object of the invention is to provide a coupling member, for interconnecting a hydraulic ejector cylinder of injection molding equipment with a mold ejector system, to insure that the mold ejector system is properly actuated and completely and fully retracted prior to commencing a further injection molding cycle.

A further object of the invention is to provide a coupling member which is readily interchangeable with a variety of different injection molding machines and equipment as well as a variety of different molds to improve the versatility and interchangeability of the coupling member.

Yet another object of the invention is to provide a coupling member which is relatively inexpensive to manufacture and maintain while also being relatively simple to install and remove from conventional injection molding equipment.

Still another object of the invention is to provide a coupling member which is formed from two mating, interconnectable components to facilitate attachment of one component with the hydraulic ejector cylinder, of desired injection molding equipment, while the other component may be attached to the mold ejector system and, by closing the mold, the two interconnectable components are coupled to and locked with one another to facilitate rapid installation and set up of the coupling member on virtually any desired injection molding equipment.

A still further object of the invention is to provide a coupling member which is sufficiently strong and durable, by being hardened via a suitable hardening process, while still being readily modified and adapted for use with various pieces of molding equipment.

The present invention relates to a coupling member for a desired injection molding equipment, said coupling member having a first end carrying a first engagement mechanism, for engagement with the desired injection molding equipment, and having an opposed second end carrying a second engagement mechanism, for engagement with a mold ejector system of a mold, wherein said coupling member comprises a first elongate stud which carries said first engagement mechanism and a second elongate stud which carries said second engagement mechanism, and said first and second elongate studs are releasably couplable to one another to form said coupling member.

BRIEF DESCRIPTION OF THE DRAWINGS

The invention will now be described, by way of example, th reference to the accompanying drawings in which.

DESCRIPTION OF THE PREFERRED EMBODIMENTS

Figure 1:
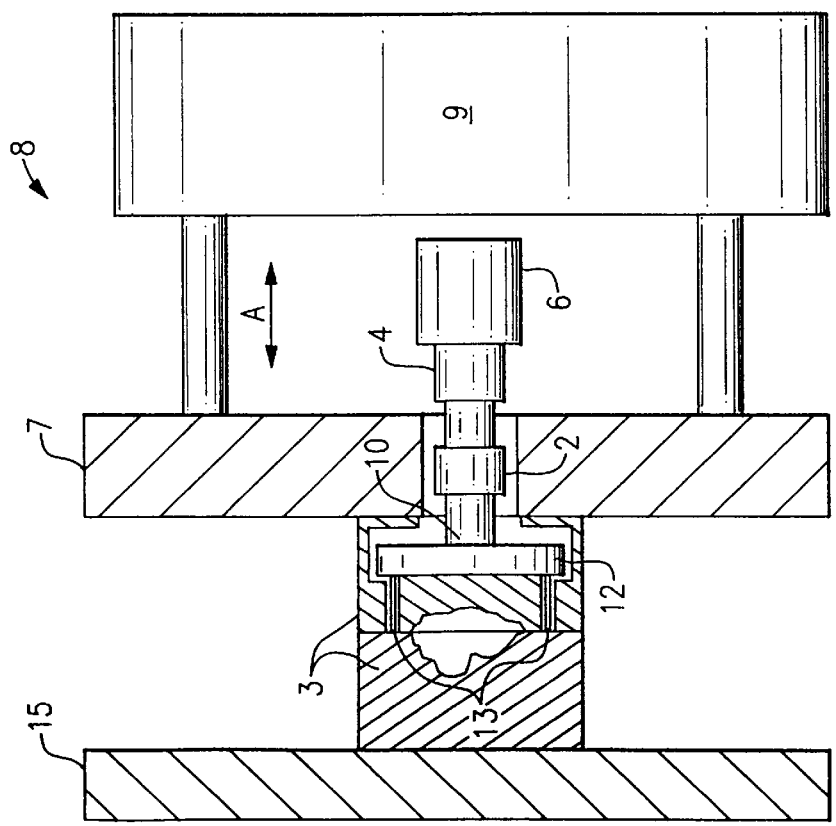
FIG. 1 is a diagrammatic partial cross-sectional view showing the use of a coupling member, according to the present invention, on known injection molding equipment.
Figure 2:
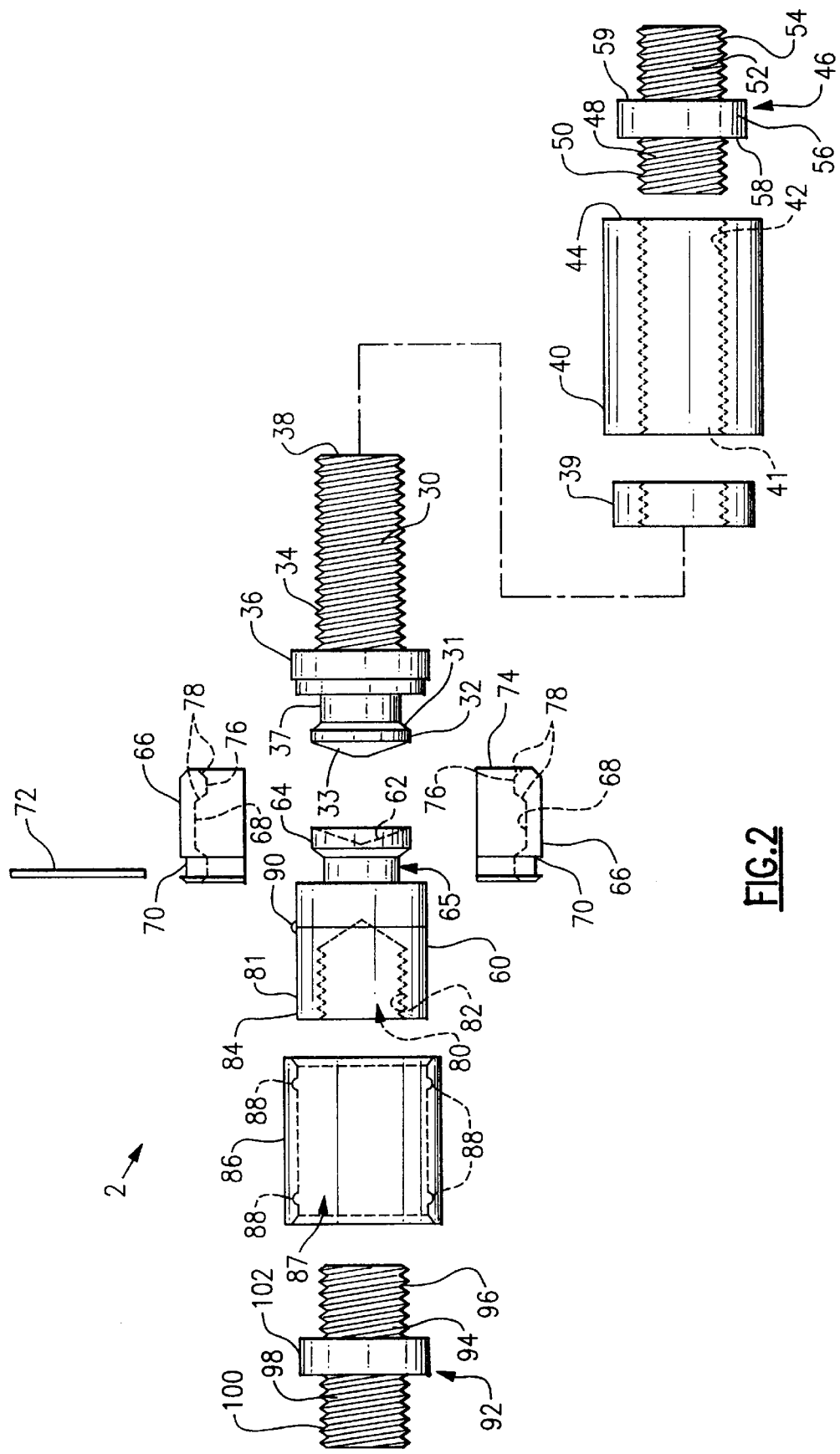
FIG. 2, is an exploded diagrammatic view of the coupling member according to the present invention.
Figure 3:
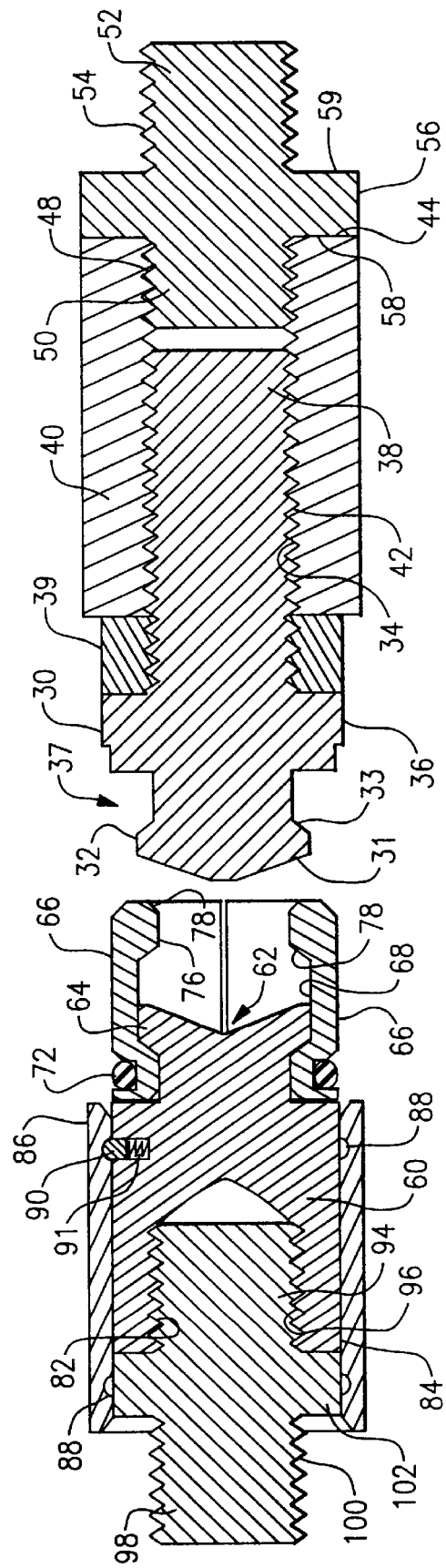
FIG. 3 is a diagrammatic cross-sectional view showing the assembled state of the first and second interconnectable studs, according to the present invention, immediately prior to their interconnection.
Figure 4:
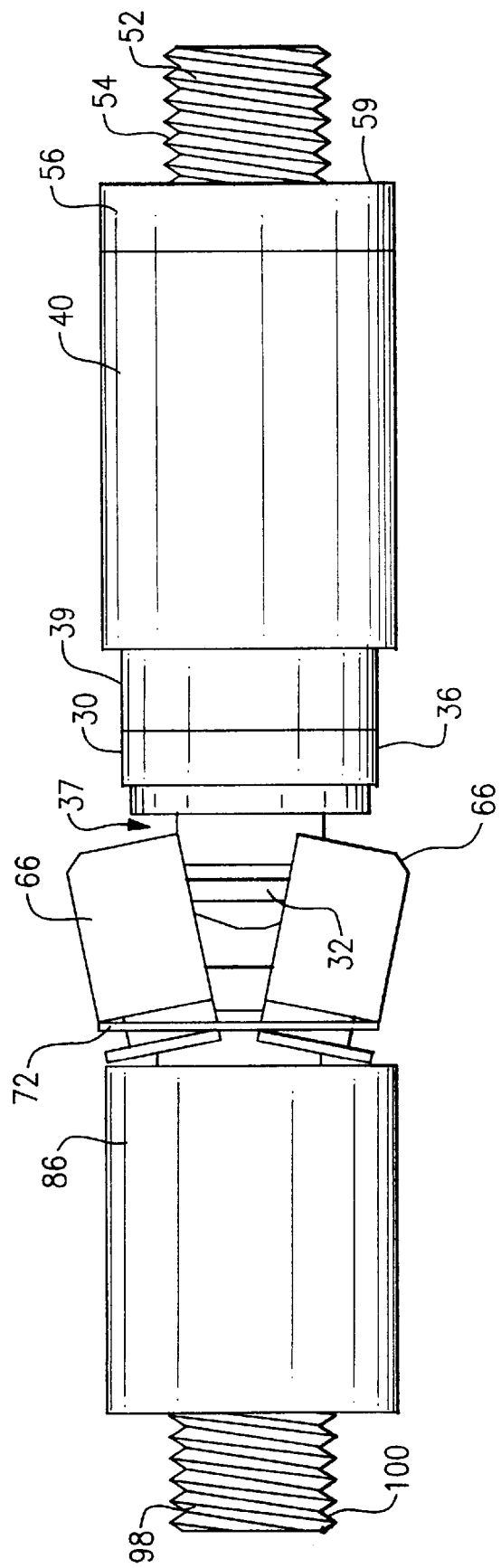
FIG. 4 is a diagrammatic view showing commencement of the interconnection between the first elongate stud with the second elongate stud to form the coupling member, according to the present invention.
Figure 5:
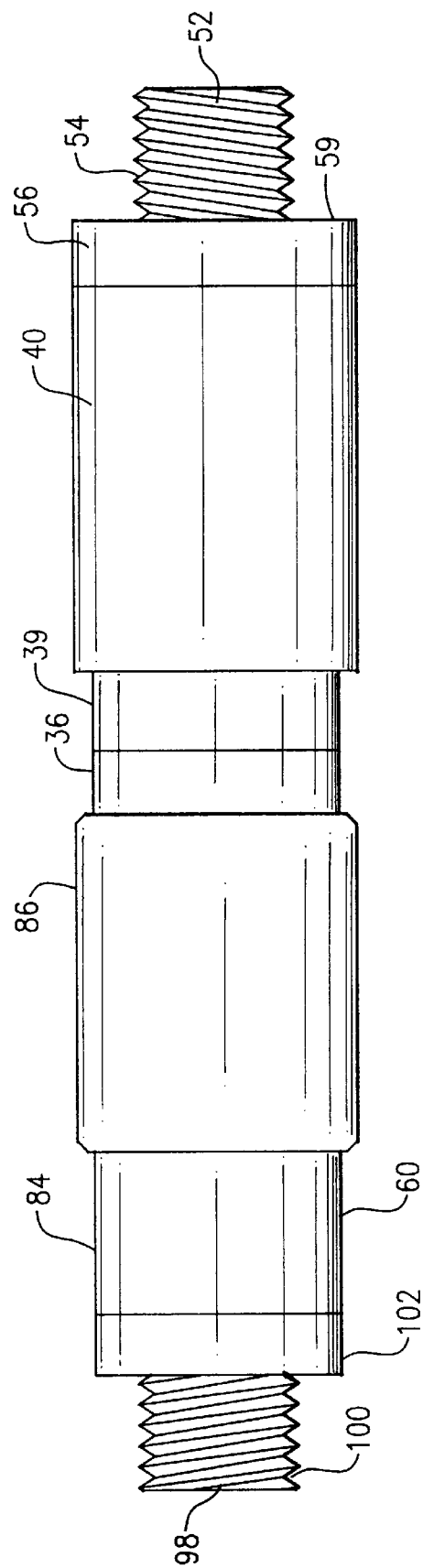
FIG. 5 is a diagrammatic view showing the interconnected and locked position of the coupling member, according to the present invention.

With reference to FIG. 1, a brief description concerning use of the present invention will now be provided. As can be seen in this Figure, the coupling member 2 for a desired two-part mold 3 has a first end portion 4, which is coupled to a bore of the ejector cylinder 6, which is typically hydraulically operated, of a desired injection molding equipment 8. The hydraulic ejector cylinder 6, which is well known in this art, moves along with the movable platen 7 to and fro in the direction of arrows A, via operation of piston/cylinder arrangement 9. The opposite end 10 of the coupling member 2 is coupled to the mold ejector system 12 and moves, via operation of the hydraulic ejector cylinder 6, the mold ejector system 12 to a forward ejector position, in which the mold ejector system ejects the molded part or component from the mold 3. Once this has occurred, the hydraulic ejector cylinder 6 returns the mold ejector system 12, via the coupling member 2, to a fully retracted position. The hydraulic ejector cylinder 6 is typically coupled to a switch of the injection molding equipment which is activated by movement of the movable platen 7. As such features are well known in the art, a further detailed description concerning the same is not provided.

A first half or portion of the mold 3 is carried by and secured to the fixed platen 15, which maintains that portion of the mold in a stationary position during the molding process. The remaining half or portion of the mold is carried by and secured to the movable platen 7, which moves to and fro in the direction of arrows A, in response to operation of the piston/cylinder arrangement 9. The coupling member 2, via its interconnection between the hydraulic ejector cylinder 6 and the mold ejector system 12, facilitates both ejection of the molded component and retraction of one or more ejector bars, sleeves, stripper plates, pins, etc., or some other ejector member(s) 13 supported by the mold ejector system 12. That is, the hydraulic ejector cylinder 6 moves the mold ejector system 12, via the coupling member 2, to an ejection position in which the ejector member(s) 13 ejects the molded part, after completion of a molding cycle, and then properly retracts the ejector assembly 12 to a fully retracted position prior to commencing a further molding cycle of the injection molding equipment. A further detailed description concerning such connection will follow below.

It is to be appreciated that in some applications the mold ejector system 12 may be spring biased in a direction toward the movable platen 7, i.e. the mold ejector system 12 is spring biased into a fully retracted position within the mold 3, while in other applications the mold ejector system 12 is freely floating and movable within an interior area of the mold 3, i.e. no spring biased. When the mold ejector system 12 is freely floating, the mold ejector system 12 must be coupled to the injection molding equipment, e.g. by the coupling member 2 of the present invention, so as to be moved to and fro by operation of the hydraulic ejector cylinder 6. When springs are employed to bias the mold ejector system 12 into a fully retracted position, the purpose of connecting the coupling member 2 to the hydraulic ejector cylinder 6 is merely to provide an abutment surface 59 against which a proximate end surface 106 of the mold ejector system 12 can abut to force the mold ejector system 12 toward an ejecting position to remove the molded component from the mold 3. Once the mold ejector system 12 is sufficiently spaced from the abutment surface 59 of the coupling member 2, the spring arrangement biases the mold ejector system 12 back into its fully retracted position.

Turning now to FIGS. 2 through 5, a detailed description concerning the coupling member of the present invention will now be provided. As can be seen especially well in FIG. 2, the coupling member 2 comprises a first elongate stud 30 having a head 32, at a first end thereof, while essentially the remaining second end 38 of the first elongate stud 30 has an external thread 34 (e.g. a ½–13 thread size) provided along its length. The head 32 is provided with a pair of opposed chamfers 31 and 33 to facilitate engagement and disengagement of the head 32 as will be described in further detail hereinafter. An cylindrical annular stop member 36 is provided adjacent the head 32 and separated therefrom by an annular recess 37. The external thread 34 extends from the second end 38 to the annular stop 36. A rotatable jam nut 39, having a mating internal thread (e.g. a ½–13 thread size), threadingly engages with the external thread 34 of the first elongate stud 30 and is rotated therealong to an initial position located adjacent the annular stop 36. The purpose and function of all of the above elements will be described below in further detail.

A rotatable elongate sleeve 40, having a through bore 41 extending therethrough and carrying a mating internal thread 42 (e.g. a ½–13 thread size), is rotated or threaded along the external thread 34 of the first elongate stud 30 to a position adjacent the jam nut 39. It is to be appreciated that the length of the rotatable elongate sleeve 40 can vary, from application to application, to facilitate coupling of various sizes and types of molds which are prevalent in the industry (e.g. the length of the rotatable elongate sleeve 40 can be from about 1.4 inches to about 10 inches). During use, the rotatable elongate sleeve 40 is rotated along the external thread 34 of the first elongate stud 30 to a desired location. Once at the desired location, the jam nut 39 is tightened against the adjacent end face of the rotatable elongate sleeve 40 to maintain those two members in their desired adjusted position.

A first link rod coupler (engagement mechanism) 46, having an elongate first portion 48 with an external thread 50 (e.g. a ½–13 thread size), is matingly received within the second opposed end 44 of the rotatable elongate sleeve 40. An opposed elongate second portion 52 is provided with an external thread 54 of a desired size (e.g. a ⅝–11, ½–13 or a desired metric thread size) to mate with a bore of a desired mold ejector system 12. The two external threads 50, 54 are separated from one another by a cylindrical link rod stop member 56. During use, the elongate first portion 48 of the first link rod coupler 46 is rotated or threaded within the second end 44 of the bore 41 of the rotatable elongate sleeve 40 until an inwardly facing surface 58 of the link rod stop member 56 abuts against the second end surface 44 of the rotatable elongate sleeve 40. Thereafter, the external thread 54 of the second portion 52 of the first link rod coupler 46 can threadingly engage a bore of a desired mold ejector system 12, located within a mold 3, to couple the first elongate stud 30 thereto and a further description concerning the same will follow. An outwardly facing ejector system abutting surface 59 is carried by the opposite surface of the link rod stop member 56. The spacing of the ejector system abutting surface 59 from an adjacent surface 107 of the movable platen 7 (see FIG. 6) as well as an adjacent end surface of the mold 3 is an important aspect of the present invention and will be described in further detail below.

The coupling member 2 also comprises a second elongate stud 60. A first end of the second stud member 60 is provided with a stud recess portion 62 which at least partially receives a leading end of the head 32 of the first elongate stud 30. A circular annular camming surface 64 is provided on the first end of the second elongate stud 60 adjacent the stud recessed portion 62. To insure a captive engagement between the first elongate stud 30 and the second elongate stud 60, the second elongate stud 60 is provided with a pair of mating link jaws 66. Each one of the pair of mating link jaws 66 is provided with a semicircular annular camming groove 68 which receives and mates with a perimeter surface of the annular camming surface 64. The diameter of the annular camming surface 64, however, is slightly greater than the diameter of the two camming grooves 68, when mated face-to-face with one another in a completely closed position, so that the mating link jaws 66 can pivot somewhat about the annular camming surface 64 from an open to a closed position and vice versa, and a further description concerning the purpose of the same will follow. The length of the camming groove 68 is long enough to closely receive and accommodate both the annular camming surface 64 as well as the head 32.

Each one of the pair of mating link jaws 66 is also provided with an exterior annular groove 70 adjacent a trailing second end thereof. The portion of the mating link jaws 66, carrying the exterior annular groove 70, is accommodated within a camming recess 65 formed between annular camming surface 64 and a remainder of the second elongate stud 60. An O-ring 72, or some other resilient member, spring or component, is accommodated within the exterior annular grooves 70 of the mating link jaws 66 to maintain the jaws in an open position (see FIG. 4) to facilitate receiving of the head 32 of the first elongate stud 30.

An inwardly facing surface of the first end 74 of the pair of mating link jaws 66, which initially engages with the head 32 of the first elongate stud 30, is provided with a semicircular shaped retaining lip 76. When the pair of mating link jaws 66 are in a closed position (FIG. 5), the semicircular shaped retaining lips 76 engage with the recess 37, adjacent the head 32, to prevent the head 32 from becoming disengaged from the second elongate stud 60. The two semicircular shaped retaining lips 76 are each provided with a pair of opposed chamfered surfaces 78 to facilitate receiving and disengaging of the head 32.

The second end 81 of the second elongate stud 60 includes a bore recess 80 carrying an internal thread 82 (e.g. a ½–13 thread size). The exterior surface 84 of the second end 81 of the second elongate stud 60 is generally cylindrical in shape. A slidable sleeve 86, having a through bore 87 extending therethrough which is slightly larger than an outer diameter of the exterior surface 84 of the second end 81 of the second elongate stud 60, surrounds the exterior surface of the second end 81 and is slidable therealong. A pair of inwardly facing annular recesses 88 are provided adjacent each opposed end of the slidable sleeve 86. A locking mechanism of the coupling member 2 generally comprises the slidable sleeve 86 cooperating with the pair of mating link jaws 66.

The exterior surface of the second elongate stud 60, adjacent the camming recess 65, is provided with a detent 90, e.g. a ball which is captively retained in a aperture but biased in an outward direction by a spring 91 (FIG. 3), for engagement with one of the two annular recesses 88 of the slidable sleeve 86. That is, the engagement between the detent 90 and either one of the two annular recesses 88 maintains the slidable sleeve 86 in either a first opened position (see FIG. 4) or a second closed and locked second position (see FIG. 5).

The second elongate stud 60 is provided with a second linking rod coupler (engagement mechanism) 92 which facilitates engagement of the second elongate stud 60 with the (hydraulic) ejector element or cylinder 6 of a desired piece of injection molding equipment. The second link rod coupler 92 has an elongate first portion 94, with an external thread 96 (e.g. a ½–13 thread size), which is matingly received within the bore recess 80 of the second elongate stud 60. An opposed second elongate portion 98 is provided with an external thread 100 of a desired size (e.g. a ⅝–11, ½–13 or a desired metric thread size) to mate with a bore of a desired hydraulic ejector cylinder 6, for example. The two external threads 96, 100 are separated from one another by a cylindrical link rod stop member 102. During use, the elongate first portion 94 of the second link rod coupler 92 is rotated or threaded within the bore recess 80 until an inwardly facing surface of the link rod stop member 102 abuts against an end surface of the second elongate stud 60. Thereafter, the external thread 100 of the second portion 98 of the link rod coupler 92 can threadingly engage a bore of a desired hydraulic ejector cylinder 6 to couple the second elongate stud 60 thereto and a further description concerning the same will follow.

Figure 6:
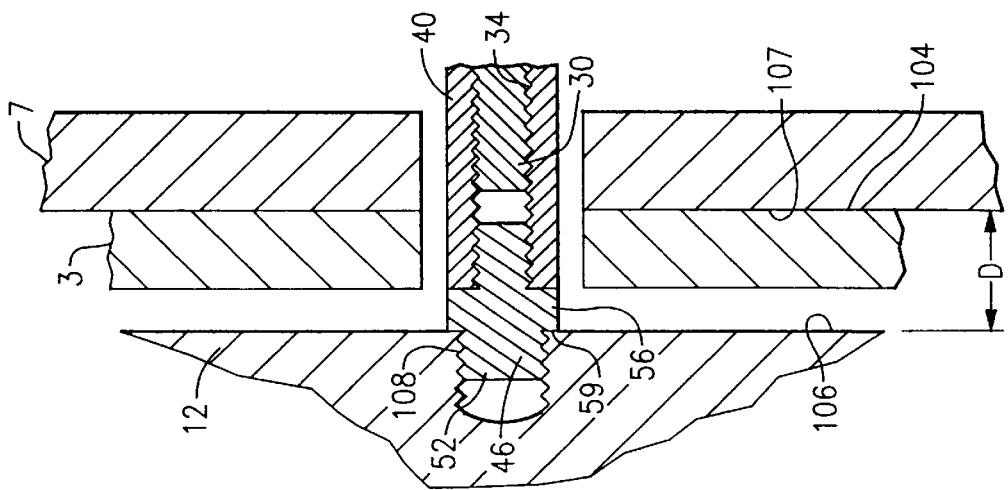
FIG. 6 is a diagrammatic view showing how the set up length of the coupling member is determined.

A detailed description concerning the use of the present invention will now be provided with reference to FIGS. 1 and 6. First, a desired mold 3 is installed on a desired injection molding equipment 8 such that the entire mold 3 is supported by the fixed platen 15. Next, the end of the second elongate stud 60, carrying the second link rod coupler 92, is threadingly engaged with the hydraulic ejector cylinder 6. Thereafter, the depth of the mold 3 is measured, i.e. the spacing or distance D between the end surface 104 of the mold 3 to abut against the movable platen 7 and a proximate end surface 106 of the mold ejector system 12 is determined, so that the coupling member 2 can be properly adjusted, if necessary. That spacing or distance D is substantially equal to the spacing or distance of the adjacent end surface 107 of the movable platen 7 from a proximate end surface 106 of the mold ejector system 12 once the mold is secured to the movable platen 7. Once this distance D is known, the jam nut 39 is loosened (i.e. rotated to a position abutting against the annular stop member 36) and the first elongate stud 30 is engaged with the second elongate stud 60. After the pair of jaws 66 adequately receive the head 32 of the first elongate stud 30, the sliding sleeve 86 is moved from its first position (FIG. 4) to its second locked position (FIG. 5) so that the first elongate stud 30 extends through an opening in the movable platen 7. Thereafter, the location of the ejector system engaging surface 59, of the first link rod coupler 46, is adjusted, by rotation of the rotatable elongate sleeve 40 axially along the first elongate stud 30 to a desired adjusted position which is equal to measured distance D, i.e. the ejector system engaging surface 59 extends out through the opening in the end surface 107 of the movable platen 7 by a distance equal to D. Thus, the spacing of the ejector system engaging surface 59 from the adjacent end surface 107 of the movable platen 7 facing and abutting the mold 3, once the mold 3 is connected thereto, is equal to the measured distance D so that when the first elongate stud 30 is screwed within the bore 108 of the mold 3, the ejector system engaging surface 59 will abut against the proximate end surface 106 of the mold ejector system 12 and facilitate proper operation thereof. Once the rotatable elongate sleeve 40 is properly located so that the ejector system engaging surface 59 is at a desired adjusted location, the jam nut 39 is hand tightened to temporarily maintain the rotatable sleeve 40 and the jam nut at that adjusted position.

Next, the first stud member 30 is removed from the second elongate stud 60, by sliding the slidable sleeve 86 to its first position and removing the first elongate stud 30 from the second elongate stud 60. The jam nut 39 and the rotatable elongate sleeve 40 are then tightened by wrenches to permanently secure the adjusted position of the rotatable elongate sleeve 40 and the jam nut 39. Thereafter, the first elongate stud 30 is threadingly engaged with the bore 108 of the mold ejector system 12 by threading the second end of the first link rod coupler 46 into the threaded bore 108 of the mold ejector system 12. Once the first elongate stud 30 is appropriately fastened to the mold ejector system 12 (i.e. tightened by suitable wrenches) with the ejector system engaging surface 59 abutting against the proximate end surface 106 of the mold ejector system 12, the movable platen 7, of the injection molding equipment, is then moved to a completely closed position (FIG. 1) such that the head 32 of the first elongate stud 30 is received by the pair of mating link jaws 66 of the second stud member 60. Once this engagement occurs, the slidable sleeve 86 is moved from its first position (FIG. 4) to its second position (FIG. 5) to lock and maintain the interconnected engagement between the first and second elongate studs 30, 60.

After this has occurred, the portion of the mold 3, which is located adjacent the movable platen 7 is then secured to the movable platen 7, in a conventional manner, by known securing or attaching means. The coupling member 2 is now properly positioned and the operator can check the opening and closing of the injection molding equipment 8 to insure that the mold is correctly adjusted and functioning properly. Any minor adjustments generally can be made by an internal adjustment system which is typically provided on conventional molding equipment.

When it is necessary to replace the coupling member 2, the above discussed procedure is substantially reversed. Briefly, the portion of the mold 3, which is located adjacent the movable platen 7, is disconnected from the movable platen 7. Next, the slidable sleeve 86 is moved from its second position (FIG. 5) to its first position (FIG. 4) to allow unlocking of the interconnected engagement between the first and second elongate studs 30, 60. The movable platen 7 is then moved away from the mold 3 and the first and second elongate studs 30, 60 are separated and can then be accessed and disconnected from one another.

The coupling member 2, according to the present invention, is typically manufactured from a suitable material, such as 1018 steel which is case hardened, so that at least the exterior surface of the coupling member 2 is very hard and durable to resist being damaged during use.

Typically, the coupling member, according to the present invention, will have a length of approximately about 2 inches to about 18 inches, more preferably about 4 inches to about 10 inches, most preferably a length of approximately 6 inches. In addition, the diameter of the coupling, according to the present invention, will typically be between a ½ inch to 1½ inches, more preferably between about ¾ inches to 1¼ inches, most preferably ⅞ inches.

Although the above discussion of the coupling member, according to the present invention, only depicts one coupling member interconnecting the hydraulic ejector cylinder with the mold ejector system, it is to be appreciated that two or more identical or similar coupling members can be utilized for such interconnection. The number and/or location of the coupling members will depend upon the size of the mold and/or the type of molding equipment being utilized. One skilled in the art will be able to readily determine the amount and/or location of the coupling members, according to the present invention, for each specific molding application.

A principle advantage of the coupling member, according to the present invention, is that it is manufactured from a plurality of individual, interconnectable components and includes a pair of link rod couplers, at each opposed end, which are easily replaceable or interchangeable. The first portion of each one of the first and second link rod couplers is provided with a thread size (½–13 thread size) which readily mates with a second end of either the first elongate stud or the second elongate stud while the second end portion of each of the first and second link rod couplers is provided with some other desired thread size to facilitate coupling to a desired piece of injection molding equipment. Replacement of one or both link rod couplers may be all that is necessary to facilitate easy modification or adaption of the coupling member so that it can be readily used on a variety of different molds or injection molding equipment. Typically one or only a few components may have to be changed to modify the coupling member for use with a completely different mold and/or on completely different injection molding equipment (e.g., one or both link rod couplers and/or a longer or shorter rotatable elongate sleeve 40 may be all that is necessary to vary the overall length of the coupling member 2.

It is to be appreciated that each of the annular stop member 36, the rotatable jam nut 39, the rotatable elongate sleeve 40, the link rod stop member 56 of the first link rod coupler 46, the second portion of the second elongate stud 60, and the link rod stop member 102 of the second linking rod coupler 92 is provided with at least a pair of opposed notches to facilitate engagement with a wrench for adequately tightening those elements.

Since certain changes may be made in the above described coupling member, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, we claim:

1. A coupling member for injection molding equipment, said coupling member having a first end carrying a first engagement mechanism, for engagement with a portion of the injection molding equipment, and having an opposed second end carrying a second engagement mechanism, for engagement with a mold ejector system of a mold;

said coupling member comprising a first elongate stud carrying said first engagement mechanism and a second elongate stud carrying said second engagement mechanism, and said first and second elongate studs being releasably couplable to one another to form said coupling member;

said first elongate stud having a head, at a first end thereof, and said second elongate stud having a stud recess portion, at a first end thereof, and, when said head is at least partially received by said stud recess portion, a locking mechanism, carried by said second elongate stud, facilitates locking of said head within said stud recess portion;

wherein both said first elongate stud and said second elongate stud each have an axial length, and the axial length of at least one of said first elongate stud and said second elongate stud is adjustable to facilitate interconnection of the portion of the injection molding equipment with the mold ejector system via said coupling member; and said second engagement mechanism comprises said second elongate stud which has a second end which includes a bore recess extending partially therethrough and carrying an internal thread.

2. The coupling member according to claim 1, wherein both said first elongate stud and said second elongate stud have a variable axial length to facilitate coupling of the portion of the injection molding equipment to the mold ejector system via said coupling member.

3. The coupling member according to claim 1, wherein said first elongate stud has an external thread provided on a second end portion thereof remote from said head;
   an elongate sleeve has a through bore extending therethrough and an internal thread is formed in the through bore, and one end of the elongate sleeve threadingly engages with the external thread of said first elongate stud;
   a jam nut, provided with an internal thread, threadingly engages with the external thread of said first elongate stud and the jam nut is located adjacent the one end of the elongate sleeve, and the jam nut facilitates locking said elongate sleeve at an adjusted position along said first elongate stud; and
   a first rod coupler has a first elongate portion with a first external thread, sized to mate with the internal thread of said elongate sleeve, and has an opposed second elongate portion which has a second external thread, sized to mate with a threaded bore of the injection molding equipment, to facilitate coupling said first elongate stud to the injection molding equipment.

4. The coupling member according to claim 1, wherein said second elongate stud has a bore recess formed therein opposite said stud recess portion, and said bore recess has an internal thread; and
   a second link rod coupler has a first elongate portion with a first external thread and an opposed second elongate portion which has a second external thread, and said first elongate portion is threadingly received within said bore recess of said second elongate stud and said opposed second elongate portion facilitates coupling of said second elongate stud to said mold ejector system.

5. The coupling member according to claim 1, wherein said locking member comprises a pivotable pair of mating link jaws, supported by said second elongate stud adjacent said stud recess portion, which are normally biased by a resilient member into an open position, with the pivotable pair of mating link jaws located away from one another, by a biasing member to facilitate receiving said head, and said pivotable pair of mating link jaws are only moved to a closed engaged position with said head by movement of said locking mechanism from an open position to a closed position.

6. The coupling member according to claim 5, wherein said locking mechanism further comprises a slidable sleeve which is slidable, along an exterior surface of a second portion of said second elongate stud from a first position, in which said pair of link jaws are allowed to be biased by said biasing member into an open position, to a second position in which said slidable sleeve locks said pair of link jaws in engagement with said head to lock said head within said stud recess portion.

7. The coupling member according to claim 6, wherein each one of said pivotable pair of mating link jaws is provided with a semicircular shaped retaining lip, adjacent a first end thereof, to assist with the locking engagement between said head and said stud recess portion.

8. The coupling member according to claim 7, wherein each said semicircular shaped retaining lip is provided with a chamfer, on at least an outwardly facing surface thereof, to facilitate receiving said head by said link jaw;
   each of said pair of mating link jaws is provided with an exterior annular groove which accommodates said biasing member; and
   said pair of mating link jaws are normally biased, by said biasing member pivoting about an annular camming surface of said second elongate stud located adjacent said stud recess portion, into the open position.

9. The coupling member according to claim 6, wherein said slidable sleeve is provided with a pair of inwardly facing annular recesses, located adjacent opposed ends thereof, and an exterior surface of said second end of said second elongate stud is provided with a biased detent for retaining said slidable sleeve in one of a first position and a second position.

10. The coupling member according to claim 1, wherein an annular stop member separates said head from said external thread.

11. The coupling member according to claim 10, wherein said annular stop member is separated from said head by an annular recess which receives a portion of said pair of link jaws; and
   said head is provided with a pair of opposed chamfers to facilitate engagement and disengagement of said head from said pair of link jaws of said second elongate stud.

12. The coupling member according to claim 1, wherein a second link rod coupler has a first elongate portion with a first external thread and an opposed second elongate portion which has a second external thread, and said first elongate portion is threadingly received within said bore recess of said second elongate stud and said opposed second elongate portion facilitates coupling of said second elongate stud to said mold ejector system.

13. The coupling member according to claim 1, wherein said coupling member is hardened, prior to use, so that at least said exterior surface of said coupling member resists damage during use.

14. The coupling member for injection molding equipment, said coupling member having a first end carrying a first engagement mechanism, for engagement with a portion of injection molding equipment, and having an opposed second end carrying a second engagement mechanism, for engagement with a mold ejector system of a mold;
   wherein said coupling member comprises a first elongate stud which carries said first engagement mechanism and a second elongate stud which carries said second engagement mechanism, and said first and second elongate studs are releasably couplable to one another to form said coupling member;
   said first elongate stud has a head, at a first end thereof, and said second elongate stud has a stud recess portion, at a first end thereof, and, when said head is at least partially received by said stud recess portion, a locking mechanism, carried by said second elongate stud, facilitates locking of said head within said stud recess portion;
   said first elongate stud has an external thread provided on a second end portion thereof remote from said head, and an annular stop member separates said head from said external thread;
   said annular stop member is separated from said head by an annular recess which receives a portion of said pair of link jaws;
   said head is provided with a pair of opposed chamfers to facilitate engagement and disengagement of said head from said pair of link jaws of said second elongate stud;
   a jam nut, having an internal thread, is supported by said second end portion of said first elongate stud which has said external thread; and a rotatable sleeve, having a bore extending therethrough which carries an internal thread, is threadingly received by said external thread of said first elongate stud with said jam nut separating said rotatable sleeve from said annular stop member.

15. The coupling member according to claim 14, wherein said first engagement mechanism comprises a first link rod coupler which has a first elongate portion with a first external thread and an opposed end having an ejector system engaging surface, and said first elongate portion is threadingly received within a second end of said bore of said rotatably elongate sleeve and said opposed second end carrying said ejector system engaging surface facilitates abutment of said coupling member with the desired mold ejector system.

16. The coupling member according to claim 14, wherein said first engagement mechanism comprises a first link rod coupler which has a first elongate portion with a first external thread and an opposed second elongate portion which has a second external thread, and said first elongate portion is threadingly received within a second end of said bore of said rotatably elongate sleeve and said opposed second elongate portion facilitates coupling of said first elongate stud to the desired mold ejector system.

17. The coupling member according to claim 16, wherein the two external threads of said first link rod coupler are separated from one another by a link rod stop member.

18. A method of connecting desired injection molding equipment to a mold ejector system of a mold with a coupling member, said method comprising the steps of:

providing said coupling member with a first end carrying a first engagement mechanism for engagement with a portion of the desired injection molding equipment;

providing an opposed second end of said coupling member with a second engagement mechanism for engagement with the mold ejector system of a mold;

forming said coupling member from a first elongate stud carrying said first engagement mechanism and a second elongate stud carrying said second engagement mechanism; and said first and second elongate studs being separate from one another but being releasably couplable to one another to form said coupling member;

forming a head on said first elongate stud, at a first end thereof;

forming a stud recess portion in said second elongate stud, at a first end thereof, forming a bore recess in said second elongate stud, opposite said stud recess portion, and forming an internal thread in said bore recess;

supporting a locking mechanism on said second elongate stud such that when said head is at least partially received by said stud recess portion, said locking mechanism facilitates locking of said head within said stud recess portion;

forming both said first elongate stud and said second elongate stud of an adjustable axial length so as to facilitate interconnection of the portion of the injection molding equipment with the mold ejector system via said coupling member.

19. The method according to claim 18, further comprising the steps of:

forming an external thread on a second end portion said first elongate stud remote from said head;

forming a through bore extending through an elongate sleeve and forming an internal thread in the through bore;

threadingly engaging one end of the elongate sleeve with the external thread of said first elongate stud;

threadingly engaging a jam nut, provided with an internal thread, with the external thread of said first elongate stud and the jam nut being located adjacent the one end of the elongate sleeve to facilitate locking said elongate sleeve at an adjusted position along said first elongate stud;

forming a first external thread, sized to mate with the internal thread of said elongate sleeve, on a first elongate portion of a first rod coupler and forming a second external thread, sized to mate with a threaded bore of the injection molding equipment, on an opposed second elongate portion of said first coupler to facilitate coupling said first elongate stud to the injection molding equipment; and forming a first elongate portion of a second link rod coupler with a first external thread and forming an opposed second elongate portion of the second link rod coupler with a second external thread, and threadingly receiving said first elongate portion with said bore recess of said second elongate stud and threadingly receiving said opposed second elongate portion with a mating threaded bore of said mold ejector system.

* * * * *